(12) United States Patent
Frank et al.

(10) Patent No.: US 12,115,609 B2
(45) Date of Patent: Oct. 15, 2024

(54) MACHINING TOOL COMPRISING A GENERATOR ASSEMBLY FOR HARVESTING ELECTRIC ENERGY AND A METHOD FOR SUCH HARVESTING

(71) Applicant: AB SANDVIK COROMANT, Sandviken (SE)

(72) Inventors: Peter Frank, Floh-Seligenthal (DE); Christian Liebaug, Christes (DE)

(73) Assignee: AB Sandvik Coromant, Sandviken (SE)

( * ) Notice: Subject to any disclaimer, the term of this patent is extended or adjusted under 35 U.S.C. 154(b) by 1066 days.

(21) Appl. No.: 16/981,203

(22) PCT Filed: Feb. 28, 2019

(86) PCT No.: PCT/EP2019/055020
§ 371 (c)(1),
(2) Date: Sep. 15, 2020

(87) PCT Pub. No.: WO2019/174926
PCT Pub. Date: Sep. 19, 2019

(65) Prior Publication Data
US 2021/0370452 A1    Dec. 2, 2021

(30) Foreign Application Priority Data
Mar. 16, 2018   (EP) .................... 18162388

(51) Int. Cl.
*B23Q 1/00*    (2006.01)
*B23Q 11/10*   (2006.01)
*B23Q 17/00*   (2006.01)

(52) U.S. Cl.
CPC ......... *B23Q 1/0027* (2013.01); *B23Q 1/0018* (2013.01); *B23Q 11/1023* (2013.01);
(Continued)

(58) Field of Classification Search
CPC .. B23Q 1/0027; B23Q 11/1023; B23Q 17/00; B23Q 1/0018; B23Q 1/34; B23B 2231/24; B23B 2270/24; Y10T 279/17111
See application file for complete search history.

(56) References Cited

U.S. PATENT DOCUMENTS 5,941,664 A  *  8/1999  Morsch .............. B23Q 11/1023
                                                    408/59
2015/0125230 A1    5/2015  De Nijs
2016/0241122 A1 *  8/2016  Tembreull ............... F04D 25/06

FOREIGN PATENT DOCUMENTS

EP         2095897 A1     9/2009
WO    WO-8604535 A1  *  8/1986
WO      2014195054 A1    12/2014

* cited by examiner

Primary Examiner — Eric A. Gates
Assistant Examiner — Reinaldo A Del Vargas Rio
(74) Attorney, Agent, or Firm — Corinne R. Gorski

(57) ABSTRACT

A machining tool for chip-removing machining includes a tool body and a generator assembly for harvesting electric energy to be used in the tool. At least one first component is secured to the tool body and a second component is movably connected to the tool body so as to, by moving with respect to the first component through interaction therewith, generate electric energy in the first component. The generator assembly includes an arrangement for conducting a medium flow to hit and act upon the second component for moving it with respect to the first component.

16 Claims, 7 Drawing Sheets

(52) U.S. Cl.
CPC ....... *B23B 2231/24* (2013.01); *B23B 2270/24* (2013.01); *B23Q 17/00* (2013.01); *Y10T 279/17111* (2015.01)

MACHINING TOOL COMPRISING A GENERATOR ASSEMBLY FOR HARVESTING ELECTRIC ENERGY AND A METHOD FOR SUCH HARVESTING

RELATED APPLICATION DATA

This application is a §371 National Stage Application of PCT International Application No. PCT/EP2019/055020 filed Feb. 28, 2019 claiming priority to EP 18162388.5 filed Mar. 16, 2018.

TECHNICAL FIELD OF THE INVENTION

The present invention relates to a machining tool for chip-removing machining, as well as a method for harvesting electric energy.

The invention is not restricted to machining tools for any particular type of machining, and the tool body may for instance have members with cutting edges secured thereto in the form of cutting inserts for chip-removing machining of a work piece by turning, milling, drilling, or boring. Thus, both rotating and non-rotating machining tools are comprised. Tools with integral cutting edges are also possible. Neither is the invention restricted to any size of such machining tools. So called extensions carrying a male and female modular interface are also to be considered to be covered by the invention.

The reason for the presence of the generator assembly for harvesting electric energy in the machining tool is that this allows to provide the machining tool with built-in monitoring electronics, such as different types of sensors, wirelessly connected to the surroundings. The electric energy generated by the movement of the second component of the generator assembly with respect to the first component may be stored in capacitors, electric batteries, or other suitable energy storage members or be directly fed to a consumer thereof within the tool, such as a sensor.

The interaction of the second component with the first component for generating electric energy may for instance take place by a relative movement of a magnet and a winding of an electric conductor generating an electric current in the conductor or by movement of a magnet with respect to another magnet connected to a cantilever provided with a member of piezoelectric material for generating electric energy by making this member flex and oscillate.

BACKGROUND ART

A machining tool of the type defined in the introduction is known through WO 2014/195054 A1. The second component in the generator assembly of this known machining tool is rotatably journaled on the tool body and is made to move with respect to the tool body and by that with respect to the first component secured to the tool body by inertial energy, such as mainly when accelerating and retarding the rotation of the tool body, which means that the tool body has to rotate for obtaining generation of electric energy by the generator assembly of that machining tool.

SUMMARY OF THE INVENTION

The object of the present invention is to provide a machining tool of the type defined in the introduction being improved in at least some aspect with respect to such machining tools already known.

The above object is obtained by providing the generator assembly of the machining tool with an arrangement configured to conduct a medium flow to hit and act upon the second component for moving it with respect to the first component electric energy may be harvested by the generator assembly of the machining tool without any requirement of movement of the tool body of the machining tool. This means that electric energy may be efficiently harvested for enabling wireless provision of sensors also in a non-rotating machining tool, such as used for turning. Furthermore, it will be possible to obtain a controlled generation of electric energy by the generator assembly of the machining tool without abrupt variations caused by accelerations and stops of tool body motions reducing stress on members of the electric system to which sensors of the machining tool belong.

According to an embodiment of the invention, the arrangement comprises at least one first medium flow channel extending through the tool body and opening towards the second component. It is suitable to conduct the medium flow used to obtain movement of the second component with respect to the first component in such a channel inside the tool body towards the second component.

According to an embodiment of the invention, the at least one first channel is connected to a second channel in the tool body designed to conduct a medium, such as used as coolant, to tool parts for the chip-removing machining so as to divert a flow of such medium from the second channel to hit the second component. By using a medium used as coolant and/or for removing chips created by the chip-removing machining to obtain the relative movement of the second component with respect to the first component for generating electric energy in the first component no additional means have to be provided for generating the medium flow used for the movement of the second component.

According to an embodiment of the invention the second component comprises a circular ring surrounding portions of the tool body, and the arrangement is configured to conduct the medium to hit the ring to make it to move by rotating around these tool body portions, and according to a further development of this embodiment the ring has an internal wall with an uneven profile designed to be hit by and form a resistance to the medium flow so as to rotate the ring. Such a profile on the internal wall of the ring will result in an efficient "pushing" of the ring around the tool body.

The profile of the internal wall of the ring does then advantageously comprise a plurality of pocket-like recesses arranged around the internal wall of the ring, and according to another embodiment of the invention the ring is then provided with an even number of pocket-like recesses. An even number of such recesses enables a symmetrical arrangement of the recesses around the internal perimeter of the ring, which applies a symmetrical force couple initiated by the medium hitting the ring. This guarantees a desired runout of the rotational movement of the ring. Bearings may also be used in the connection of the ring to the tool body for creating a good quality runout.

According to an embodiment of the invention, the at least one first channel ends to direct a medium flow to hit an internal wall of the ring in an angle thereto differing from 90°, such as in a direction being more tangential than radial with respect to the shape of the ring, in which this angle is 1°-80°, 1°-60° or 1°-30°. Such a direction of a medium flow onto the internal wall of the ring is favourable for making the ring to move with respect to the tool body.

According to an embodiment of the invention, the second component comprises at least one magnet and the first component comprises a first member interacting with the magnet when passed thereby while generating electric energy in the first component.

The first component may then according to an embodiment of the invention comprise a cantilever having one end secured to the tool body, the first member is magnetic and arranged on the cantilever to make the cantilever flex and oscillate by interaction with the at least one magnet of the second component, and the first component comprises a second member of piezoelectric material secured to the cantilever and to flex and oscillate therewith for generating electric energy. Depending upon the orientation of the poles of the at least one magnet of the second component this will either attract or repel the first member when passing it to make the cantilever flex and oscillate for generating electric energy in the second member of piezoelectric material.

Another option to generate electric energy in the first component is according to an embodiment of the invention to have a first member in the form of a winding of an electric conductor so as to generate electric energy therein by electromagnetic induction when passed by the at least one magnet of the second component.

According to an embodiment of the invention the second component is provided with a plurality of magnets distributed along the extension thereof to consecutively pass the first member of the first component to generate electric energy in the first component. The provision of the second component with a plurality of magnets enables efficient generation of electric energy in the first component. It is then suitable to provide the second component with an even number of magnets. And the magnets of the second component have according to another embodiment of the invention different poles arranged to be closest to the first member upon passing thereof, such as every second being a north pole and every second a south pole along the extension of the second component. Such a pole switching makes the electric energy generation even more efficient.

According to an embodiment of the invention the machining tool comprises a plurality of first components secured to the tool body at mutual distances along a movement path of the second component to interact therewith to generate electric energy in these first components. The electric energy generation by the generator assembly of the machining tool may be increased by having a plurality of first components.

According to a further development of the embodiment last mentioned the cantilever of at least one first component has a different resonance frequency than the cantilever of another first component so as to oscillate at a maximum at different speeds of the second component with respect thereto. This means that the generation of electric energy in the generator assembly will be less dependent upon the speed of the second component with respect to the tool body and by that to the first component than would there only be one first component or all first components be identical.

According to an embodiment of the invention the circular ring comprises for each at least one magnet a recess opening axially and to arrive to be directed towards the first member of the first component when the second component is moving with respect to the first component. The ring is according to another embodiment of the invention made of a non-magnetic material, such as brass, aluminum, or stainless steel.

The object of the invention is with respect to the method for harvesting electric energy obtained by providing it with a step of conducting a medium flow to hit the second component for moving it with respect to the first component. The advantages of such a method and of the embodiment thereof to conduct a medium used as coolant and/or for removing chips created by a chip-removing machining to hit and act upon a second component for moving it with respect to the first component appear from the above discussion of the machining tool according to the present invention.

Other advantageous features as well as advantages of the present invention appear from the description following below.

BRIEF DESCRIPTION OF THE DRAWINGS

With reference to the appended drawings, below follows a specific description of embodiments of the invention cited as examples.

In the drawings.

DETAILED DESCRIPTION OF EMBODIMENTS OF THE INVENTION

Figure 1:
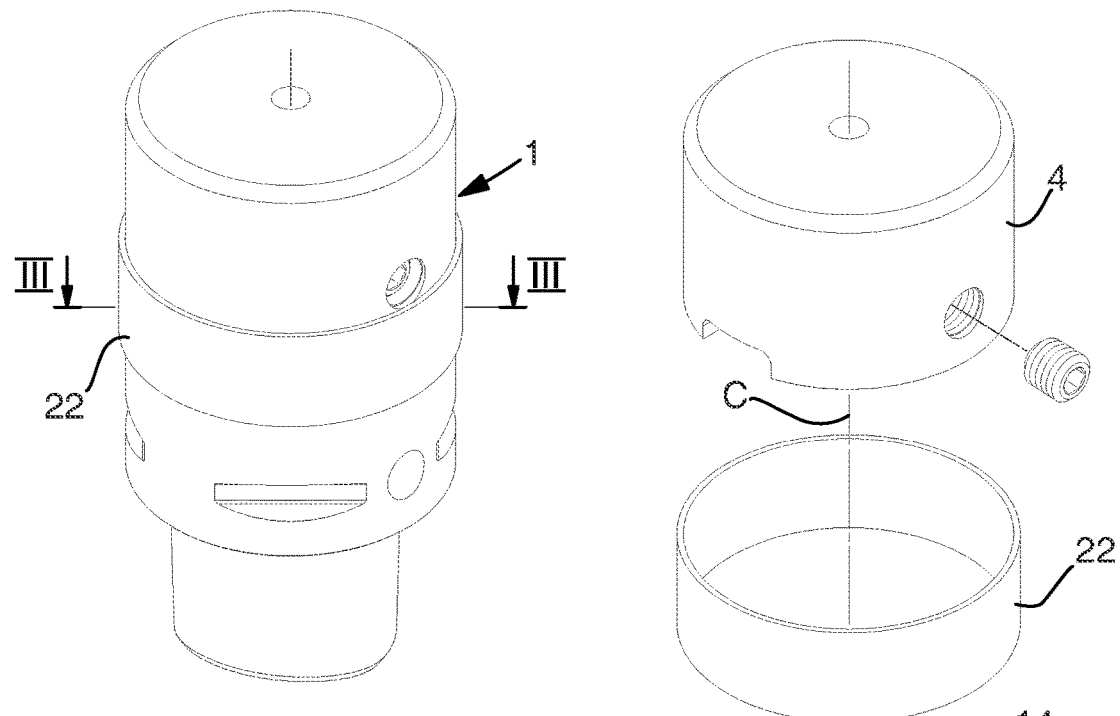
FIGS. 1 and 1a are a perspective view and an exploded view, respectively, of a machining tool according to a first embodiment of the invention.
Figure 1A:
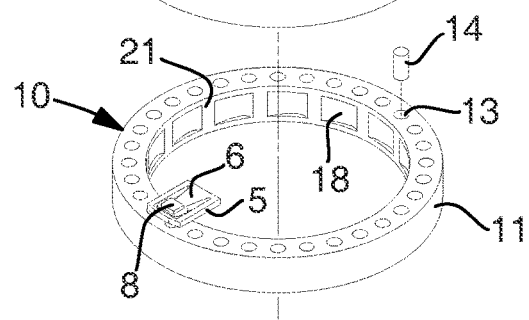
Figure 1A:
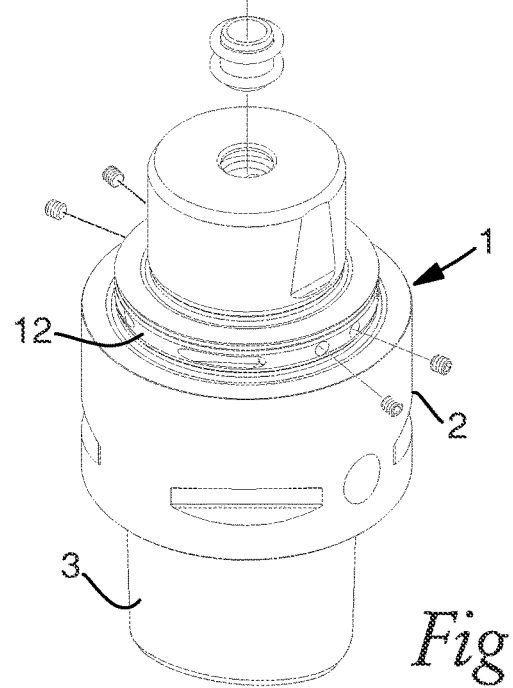
Figure 2:
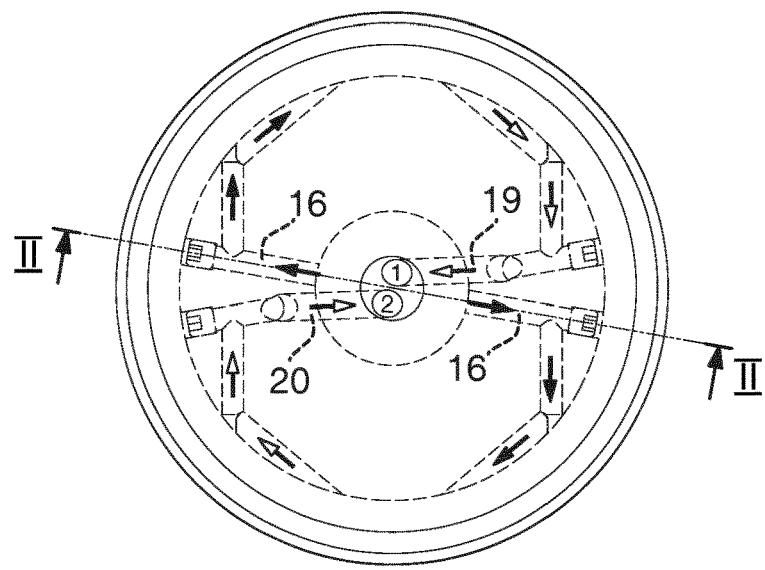
FIG. 2 is a cross section view according to II-II of the machining tool in FIG. 1 in assembled state.
Figure 2:
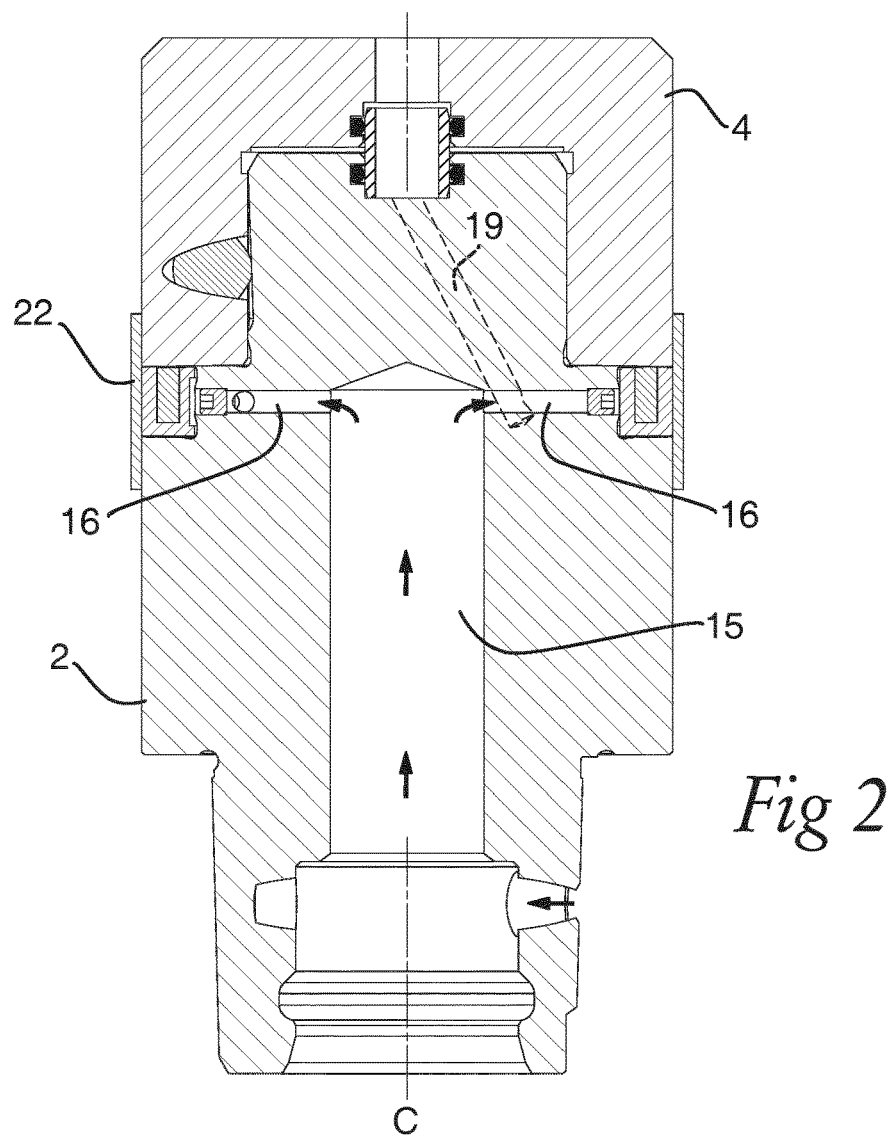

FIGS. 1 and 1a illustrate schematically the construction of a machining tool 1 according to a first embodiment of the invention, and the features of this tool will now be described while making reference to FIGS. 1-5. The machining tool has a tool body 2 with a chuck 3, and a tool holder member 4, to which members with cutting edges are to be secured for any type of machining, such as turning, milling or boring, is secured to the tool body.

The machining tool has a generator assembly for harvesting electric energy to be used in built-in monitoring electronics of the tool not shown in the figures. This generator assembly has one first component 5 secured to the tool body 2. This first component comprises a cantilever 6 having one end 7 secured to the periphery of the tool body and extending perpendicularly to a centre axis C of the tool body. A first member in the form of a magnet 8 is arranged on the cantilever close to the free end of the cantilever. A second member in the form of a plate 9 of piezoelectric material is secured to the cantilever so as to flex would the cantilever flex. The first component is protected by a cover 22.

The generator assembly has a second component 10 movably connected to the tool body 2 allowing it to rotate around the tool body. This second component comprises a circular ring 11 of a non-magnetic material surrounding portions 12 of the tool body. The ring is provided with a plurality of recesses 13 opening axially and each provided with a magnet 14 (see especially FIG. 5).

Figure 3:
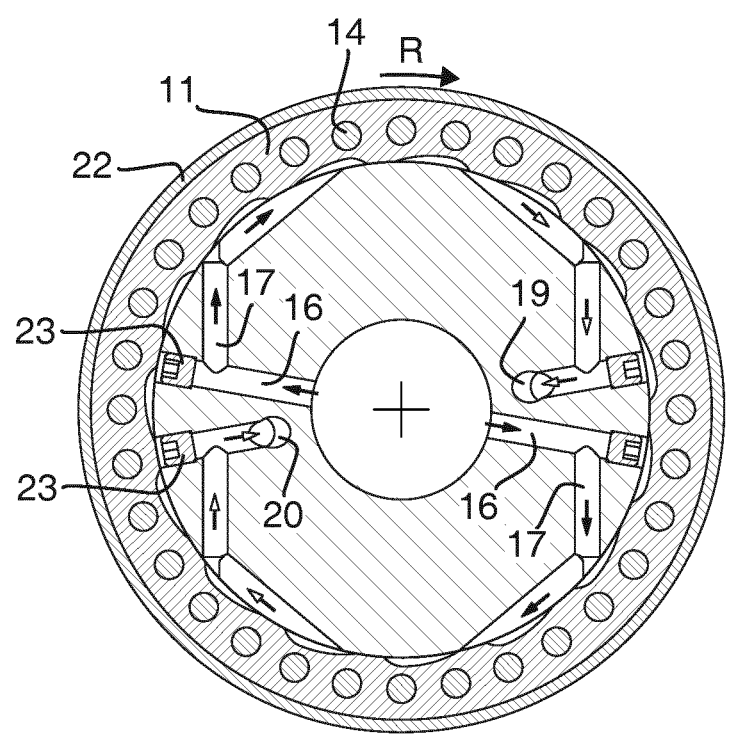
FIG. 3 is a cross section view according to III-III in FIG. 1 of the tool according to FIG. 1.
Figure 4:
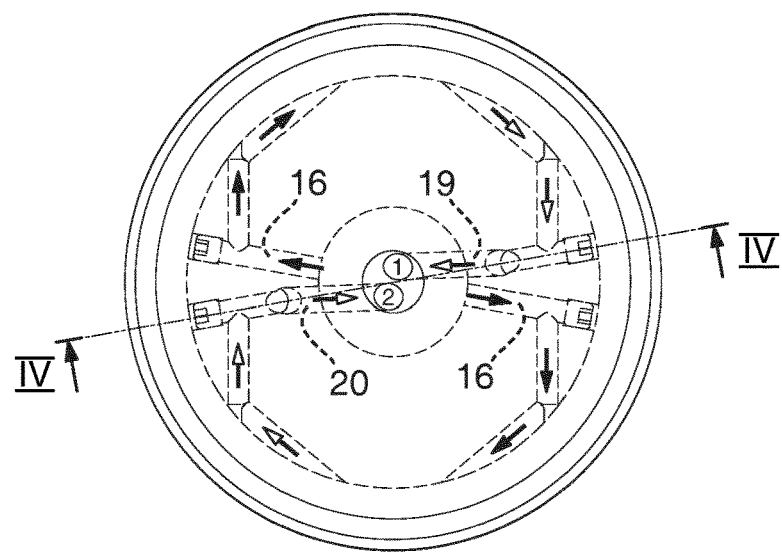
FIG. 4 is a cross section view according to IV-IV of the machining tool according to FIG. 1.
Figure 4:
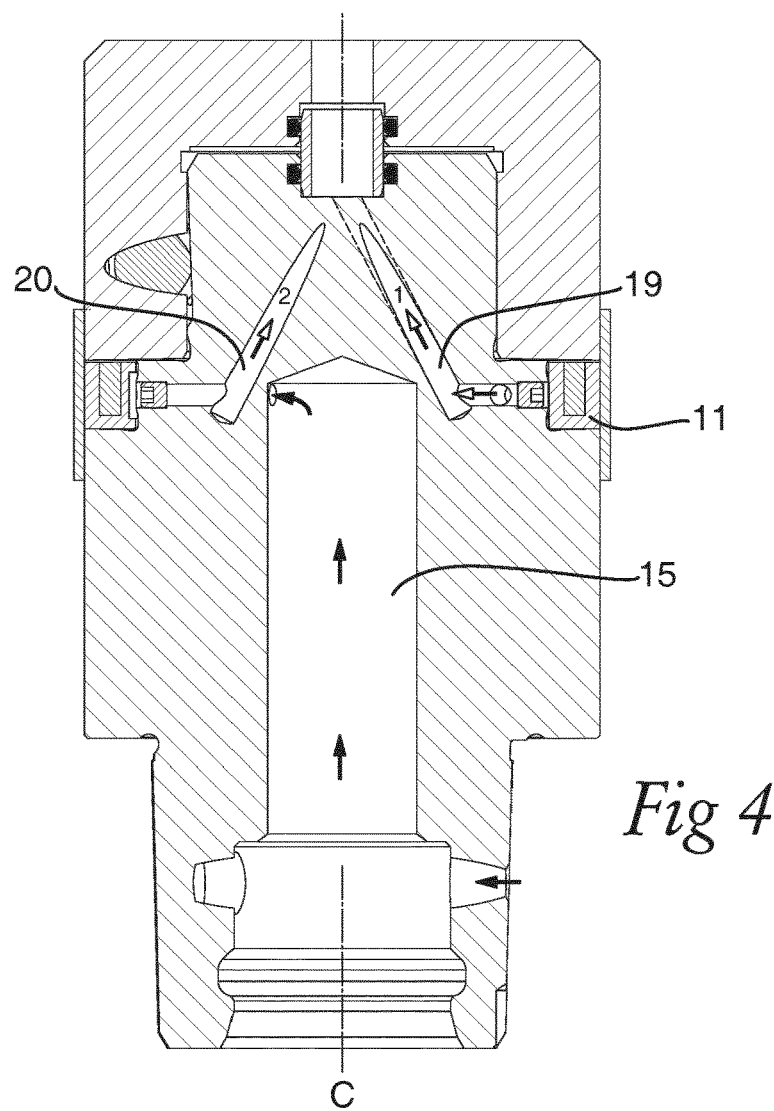
Figure 5:
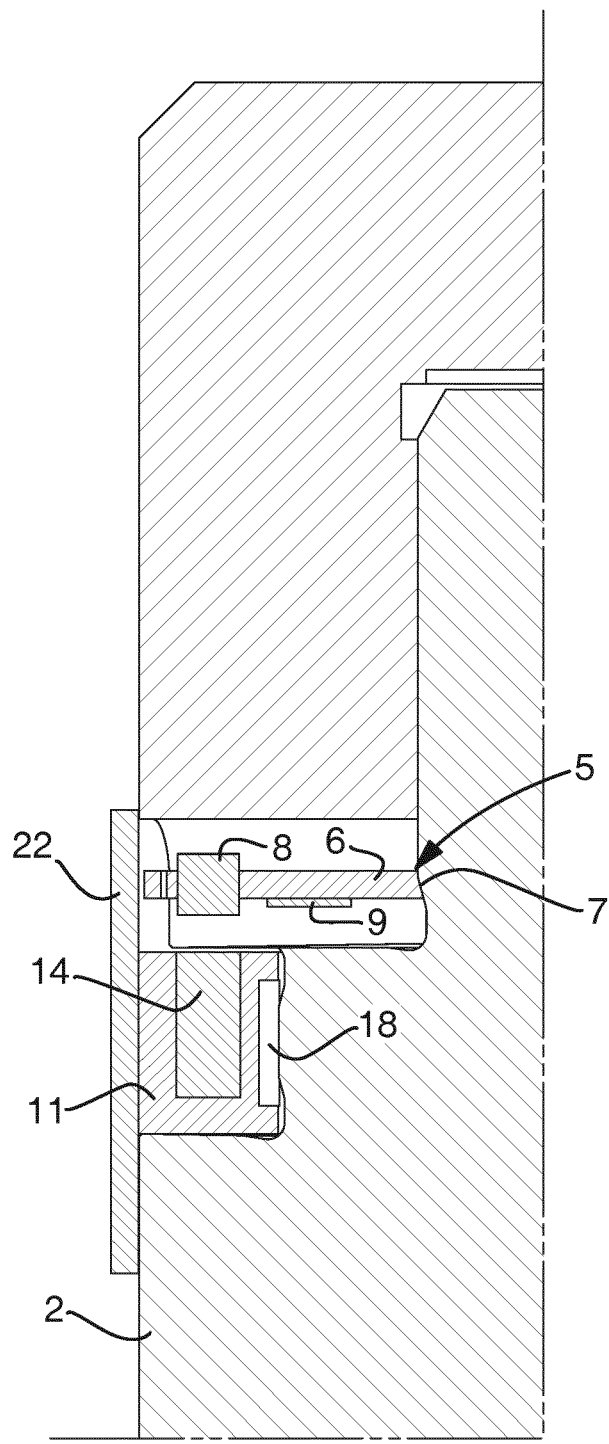
FIG. 5 is an enlarged view of a part of a cross section of the machining tool according to FIG. 1, FIGS. 6 and 6a are views corresponding to FIG. 1 and 1a, respectively, of a machining tool according to a second embodiment of the invention.

The tool body 2 has a second channel 15 extending along the centre axis C of the tool body towards the end of the tool holder member 4 for conducting a medium used as coolant and/or for removing chips created by chip-removing machining. Two first channels 16 connect to the second channel 15 inside the tool holder to divert the medium flow perpendicularly to the centre axis C of the tool and to open towards the internal wall 21 of the ring 11. It is shown in FIG. 3 how these two first channels 16 have an end provided with a plug 23 and before that a branch 17 leading to the ring while making a smaller angle than 90°, such as being in a nearly tangential direction with respect to the internal wall 21 of the ring. The internal wall of the ring has a profile designed to form a resistance to the medium flow hitting the internal wall through a channel branch 17. The profile of the internal wall has for this sake a plurality of pocket-like recesses 18 arranged around the internal wall of the room. Thus, when the medium flow hits the internal wall of the ring this will cause the ring to rotate in the counter-clockwise direction as seen in FIG. 3. The medium flow will continue through the tool body through two channels 19, 20 to be used as coolant and/or for removing chips created by the chip-removing machining.

Electric energy to be used in the machining tool according to this embodiment of the invention will be harvested by the generator assembly thereof in the following way. A gaseous or a liquid medium flow for the chip-removing machining of the tool is conducted through the first channels 16 and the branches 17 thereof to hit the internal wall 21 of the ring 11 and finds a resistance in the pocket-like recesses 18 and makes by that the ring 11 to rotate about the tool body 2. The magnets 14 of the ring 11 will when passing the magnet 8 on the cantilever 6 interact therewith to either attract or repel that magnet, so that the cantilever will flex and oscillate. The member 9 of piezoelectric material secured to the cantilever 6 will then also flex and oscillate and through the piezoelectric property thereof generate an electric current which will be led to electric energy storing means or directly to equipment, such as a sensor, consuming this energy.

Figure 6:
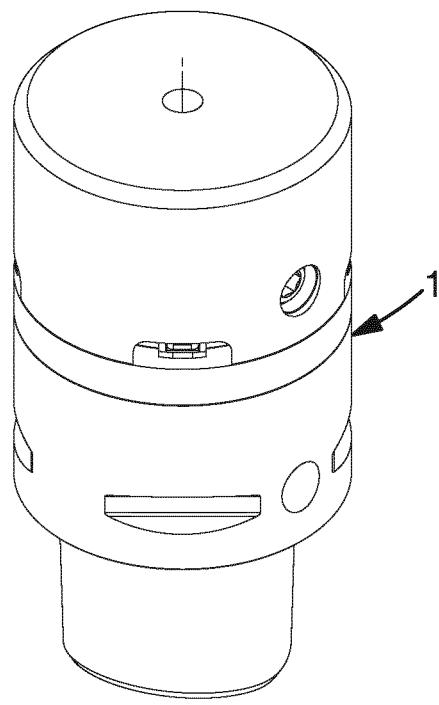

FIG. 6 illustrates schematically a machining tool according to a second embodiment of the invention functioning with respect to the harvesting of electric energy according to the same principal as the first embodiment. This embodiment differs from the first one by having only one magnet 14 received in the ring 11 and by having four first components 5 of the type shown in FIG. 5, and the cantilever of at least one first component has preferably a different resonance frequency than the cantilever of another first component so as to oscillate at the maximum at different speeds of the second component (the ring 11 with magnet 14) with respect thereto. It is also shown that the internal wall of the ring 11 has in this embodiment a smooth profile without recesses. It will still be possible to obtain a rotation of the ring 11 around the tool body by a proper medium flow with respect to strength and direction conducted to hit the internal wall of the ring.

Figure 6A:
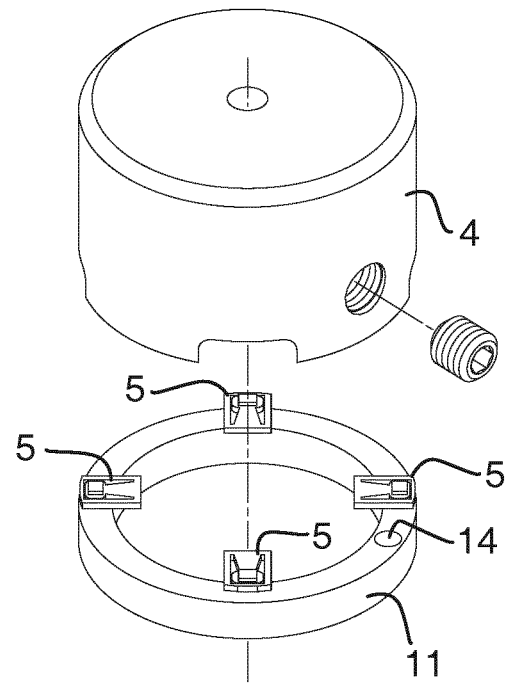
Figure 6A:
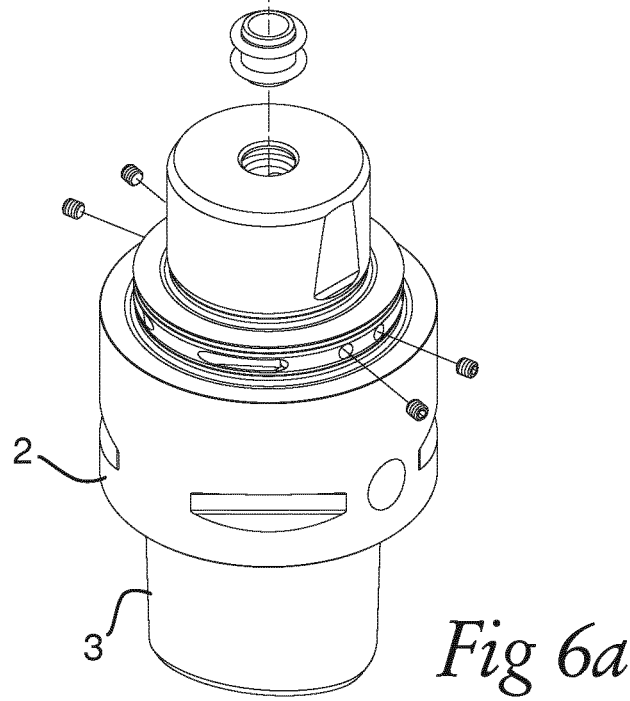
Figure 7:
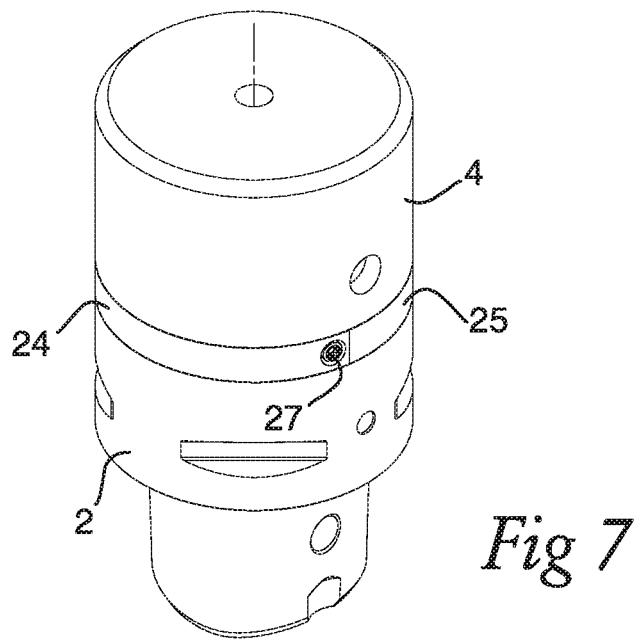
FIGS. 7 and 7a are views corresponding to FIG. 1 and 1a, respectively, of a machining tool according to a third embodiment of the invention.
Figure 7A:
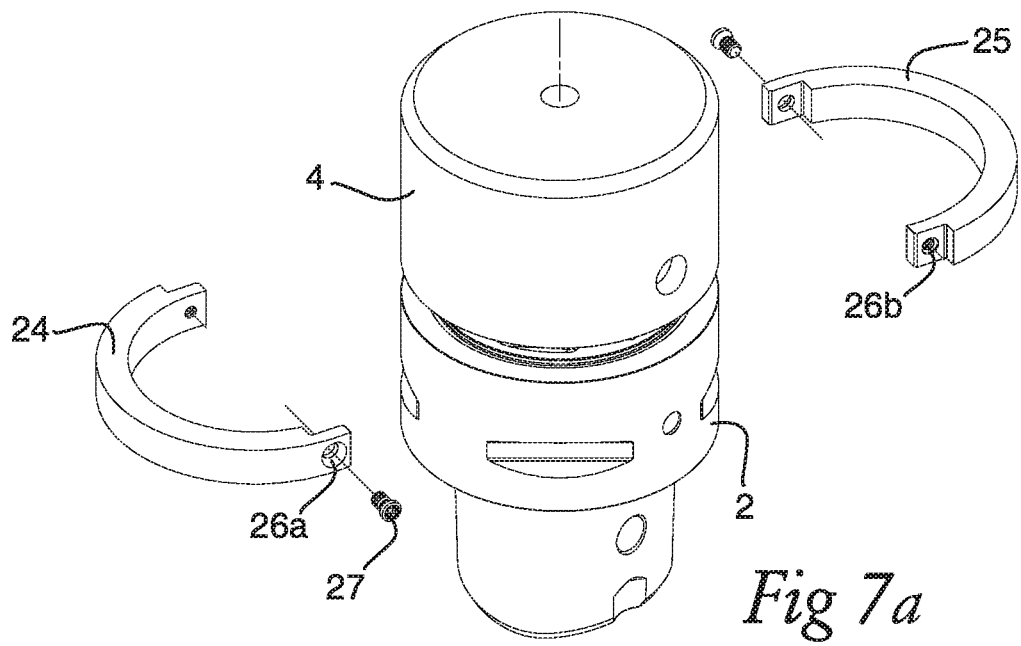

The tool body 2 and the tool holder member 4 are in a third embodiment of the invention integrated in one piece for improving the resistance of the tool to high forces applied on cutting edges of inserts of the tool, and the second component may then comprise two or more arc-like pieces, such as two half rings 24, 25 as shown in FIG. 6a, jointly forming a ring by a suitable connection, such as screw connections 26, 27. This embodiment is shown in FIGS. 7 and 7a.

The invention is of course not restricted to the embodiments thereof described above, but many possibilities to modifications thereof would be apparent to a person with skill in the art without departing from the scope of the invention as defined in the appended claims.

The arrangement may have only one or more than two first channels opening towards the internal wall of the ring.

The second component may be influenced by the medium flow to move to and fro along the circumference of the tool body between two extreme positions instead of rotating therearound.

The second component ring could also be made of a magnetic material with pole areas.

The invention claimed is:

1. A machining tool for chip-removing machining comprising:
a tool body; and
a generator assembly arranged for harvesting electric energy to be used in the tool and having at least one first component secured to the tool body and a second component movably connected to the tool body so as to, by moving with respect to the first component through interaction, therewith generate electric energy in the first component, the generator assembly including an arrangement configured to conduct a medium flow to hit and act upon the second component for moving it with respect to the first component, wherein the second component includes at least one magnet and the first component includes a first member interacting with the magnet when passed thereby while generating electric energy in the first component, and wherein the first component includes a cantilever having one end secured to the tool body, wherein the first member is magnetic and arranged on the cantilever to make the cantilever flex and oscillate by interaction with the at least one magnet of the second component, and wherein the first component includes a second member of piezoelectric material secured to the cantilever and arranged to flex and oscillate therewith for generating electric energy.

2. The machining tool according to claim 1, wherein the arrangement includes at least one first medium flow channel extending through the tool body and opening towards the second component.

3. The machining tool according to claim 2, wherein the at least one first medium flow channel is connected to a second channel in the tool body arranged to conduct a medium, a coolant, to tool parts for the chip-removing machining so as to divert a flow of such medium from the second channel to hit the second component.

4. The machining tool according to claim 2, wherein the second component includes a circular ring surrounding portions of the tool body, and that the arrangement is configured to conduct the medium to hit the ring to make it to move by rotating around surrounding portions of the tool body.

5. The machining tool according to claim 4, wherein the at least one first medium flow channel ends to direct a medium flow to hit an internal wall of the ring at an angle thereto differing from 90°, in a direction being more tangential than radial with respect to the shape of the ring, in which the angle is 1°-80°, 1°-60° or 1°-30°.

6. The machining tool according to claim 4, wherein the ring has an internal wall with an uneven profile arranged to be hit by and form a resistance to the medium flow so as to rotate the ring.

7. The machining tool according to claim 6, wherein the profile of the internal wall of the ring includes a plurality of pocket-like recesses arranged around the internal wall of the ring.

8. The machining tool according to claim 7, wherein the ring is provided with an even number of pocket-like recesses.

9. The machining tool according to claim 4, wherein the circular ring includes for each at least one magnet, a recess opening axially in which the magnet is provided.

10. The machining tool according to claim 4, wherein the ring is made of a non-magnetic material selected from brass, aluminium or stainless steel.

11. The machining tool according to claim 1, wherein the first member is a winding of an electric conductor so as to generate electric energy therein by electromagnetic induction when passed by the at least one magnet of the second component.

12. The machining tool according to claim 1, wherein the second component is provided with a plurality of magnets distributed along the extension thereof and arranged, when the second component moves with respect to the first component, the plurality of magnets consecutively pass the first member of the first component to generate electric energy in the first component.

13. The machining tool according to claim 12, wherein the second component is provided with an even number of magnets.

14. The machining tool according to claim 12, wherein the magnets of the second component have different poles arranged to be closest to the first member upon passing thereof, every second being a north pole and every second a south pole along the extension of the second component.

15. The machining tool according to claim 1, comprising a plurality of first components secured to the tool body and arranged at mutual distances along a movement path of the second component to interact therewith to generate electric energy in these first components.

16. The machining tool according to claim 1, wherein the cantilever of at least one first component has a different resonance frequency than the cantilever of another first component so as to oscillate at a maximum at different speeds of the second component with respect thereto.

\* \* \* \* \*